(12) United States Patent
Wei et al.

(10) Patent No.: US 12,170,560 B2
(45) Date of Patent: Dec. 17, 2024

(54) NETWORK ENTITY, USER EQUIPMENT, AND METHOD

(71) Applicant: Sony Group Corporation, Tokyo (JP)

(72) Inventors: Yuxin Wei, Basingstoke (GB); Yassin Aden Awad, Basingstoke (GB); Vivek Sharma, Basingstoke (GB); Samuel Asangbeng Atungsiri, Basingstoke (GB); Hideji Wakabayashi, Basingstoke (GB)

(73) Assignee: SONY GROUP CORPORATION, Tokyo (JP)

(*) Notice: Subject to any disclaimer, the term of this patent is extended or adjusted under 35 U.S.C. 154(b) by 0 days.

(21) Appl. No.: 18/223,551

(22) Filed: Jul. 19, 2023

(65) Prior Publication Data

US 2023/0361824 A1   Nov. 9, 2023

Related U.S. Application Data

(63) Continuation of application No. 17/428,283, filed as application No. PCT/EP2020/053590 on Feb. 12, 2020, now Pat. No. 11,757,504.

(30) Foreign Application Priority Data

Feb. 13, 2019 (EP) ..................... 19156988

(51) Int. Cl.
  *H04B 7/06* (2006.01)
  *H04B 7/185* (2006.01)
  *H04W 72/23* (2023.01)

(52) U.S. Cl.
  CPC ......... *H04B 7/0617* (2013.01); *H04B 7/0695* (2013.01); *H04B 7/18541* (2013.01); *H04W 72/23* (2023.01)

(58) Field of Classification Search
  CPC   H04B 7/0695; H04B 7/18541; H04W 72/042
  See application file for complete search history.

(56) References Cited

U.S. PATENT DOCUMENTS

| 10,009,093 B2* | 6/2018 | Purkayastha | ......... H04W 64/00 |
| 2016/0323800 A1* | 11/2016 | Ulupinar | ............ H04B 7/18541 |

(Continued)

FOREIGN PATENT DOCUMENTS

| CN | 106060870 A | 10/2016 |
| CN | 107548158 A | 1/2018 |

(Continued)

OTHER PUBLICATIONS

International Search Report and Written Opinion mailed on Mar. 23, 2020, received for PCT Application PCT/EP2020/053590, Filed on Feb. 12, 2020, 11 pages.

(Continued)

*Primary Examiner* — Jaison Joseph
(74) *Attorney, Agent, or Firm* — XSENSUS LLP

(57) ABSTRACT

The present disclosure pertains to a network entity for a mobile telecommunications system having circuitry configured to communicate with at least one user equipment, wherein the circuitry is further configured to transmit, to the at least one user equipment, time information for indicating a beam which will cover the at least one user equipment.

15 Claims, 5 Drawing Sheets

(56) References Cited

U.S. PATENT DOCUMENTS

| | | | |
|---|---|---|---|
| 2018/0097556 A1 | 4/2018 | Nagaraja | |
| 2018/0219606 A1 | 8/2018 | Ng | |
| 2019/0215701 A1* | 7/2019 | Honglei | H04B 7/0617 |
| 2020/0037330 A1* | 1/2020 | Sharma | H04B 17/318 |
| 2020/0153500 A1* | 5/2020 | Kim | H04B 7/18541 |
| 2020/0344651 A1* | 10/2020 | Yang | H04W 36/0016 |
| 2021/0058171 A1* | 2/2021 | Alasti | H04B 17/404 |
| 2021/0083914 A1* | 3/2021 | Cao | H04L 5/0053 |
| 2021/0250781 A1* | 8/2021 | Dang | H04B 7/0408 |
| 2022/0060250 A1* | 2/2022 | Xu | H04B 7/18519 |
| 2022/0086671 A1* | 3/2022 | Hong | H04W 16/28 |
| 2022/0109478 A1* | 4/2022 | Wei | H04W 72/23 |

FOREIGN PATENT DOCUMENTS

| | | |
|---|---|---|
| CN | 107852705 A | 3/2018 |
| WO | WO-2018078060 A1 | 5/2018 |
| WO | WO-2018115387 A1 | 6/2018 |
| WO | WO-2018143702 A1 | 8/2018 |

OTHER PUBLICATIONS

3GPP, "Study on New Radio (NR) to Support Non Terrestrial Networks (Release 15)", 3GPP TR 38.811 V15.0.0, Jun. 2018, pp. 1-118.

3GPP, "NR; Medium Access Control (MAC) Protocol Specification (Release 15)", 3GPP TS 38.321 V15.3.0, Sep. 2018, pp. 1-76.

Samsung, "On Beam Management, Measurement and Reporting", 3GPP TSG RAN WG1 Meeting 90bis, R1-1717605, Oct. 9-13, 2017, 16 pages.

Sony, "Discussions on Handover in NTN", 3GPP TSG RAN WG1 Meeting #93, R1-1807243, May 21-25, 2018, 5 pages.

Samsung "R1-1717612 Discussion on beam indication for POSCH" 3Gpp TSG RAN WG1 meeting #90bis, Prague, Czech, (Oct. 9-13, 2017) (Year: 2017).

* cited by examiner

NETWORK ENTITY, USER EQUIPMENT, AND METHOD

CROSS-REFERENCE TO RELATED APPLICATIONS

The present application is a continuation of U.S. application Ser. No. 17/428,283, filed Aug. 4, 2021, which is based on PCT filing PCT/EP2020/053590, filed Feb. 12, 2020, which claims priority to EP 19156988.8, filed Feb. 13, 2019, the entire contents of each are incorporated herein by reference.

TECHNICAL FIELD

The present disclosure generally pertains to a network entity for a mobile telecommunications system, user equipment for a mobile telecommunications system and mobile telecommunications system method.

TECHNICAL BACKGROUND

Several generations of mobile telecommunications systems are known, e.g. the third generation ("3G"), which is based on the International Mobile Telecommunications-2000 (IMT-2000) specifications, the fourth generation ("4G"), which provides capabilities as defined in the International Mobile Telecommunications-Advanced Standard (IMT-Advanced Standard), and the current fifth generation ("5G"), which is under development and which might be put into practice in the year 2020.

A candidate for providing the requirements of 5G is the so-called Long Term Evolution ("LTE"), which is a wireless communications technology allowing high-speed data communications for mobile phones and data terminals and which is already used for 4G mobile telecommunications systems. Other candidates for meeting the 5G requirements are termed New Radio (NR) Access Technology Systems. An NR can be based on LTE technology, just as some aspect of LTE was based on previous generations of mobile communications technology.

For example, from an introduction part from 3GPP TR 38.811 document "3rd Generation Partnership Project; Technical Specification Group Radio Access Network; Study on New Radio (NR) to support non terrestrial networks (Release 15)" it is known that thanks to the wide service coverage capabilities and reduced vulnerability of space/airborne vehicles to physical attacks and natural disasters, Non-Terrestrial Networks (NTN) are expected to

- foster the roll out of 5G service in un-served areas that cannot be covered by terrestrial 5G network (isolated/remote areas, on board aircrafts or vessels) and underserved areas (e.g. sub-urban/rural areas) to upgrade the performance of limited terrestrial networks in cost effective manner,
- reinforce the 5G service reliability by providing service continuity for M2M/IoT devices or for passengers on board moving platforms (e.g. passenger vehicles-aircraft, ships, high speed trains, bus) or ensuring service availability anywhere especially for critical communications, future railway/maritime/aeronautical communications, and to
- enable 5G network scalability by providing efficient multicast/broadcast resources for data delivery towards the network edges or even user terminal.

Although there exist techniques for transmission in Non-Terrestrial Networks, it is generally desirable to improve the existing techniques.

SUMMARY

According to a first aspect, the disclosure provides a network entity for a mobile telecommunications system comprising circuitry configured to communicate with at least one user equipment, wherein the circuitry is further configured to transmit, to the at least one user equipment, time information for indicating a beam which will cover the at least one user equipment.

According to a second aspect, the disclosure provides a user equipment for a mobile telecommunications system comprising circuitry configured to communicate with at least one network entity, wherein the circuitry is further configured to determine a beam which will cover the user equipment on the basis of time information.

According to a third aspect, the disclosure provides a mobile telecommunications system method for providing communication between at least one user equipment and at least one network entity, comprising determining a beam which will cover the at least one user equipment on the basis of time information.

Further aspects are set forth in the dependent claims, the following description and the drawings.

BRIEF DESCRIPTION OF THE DRAWINGS

Embodiments are explained by way of example with respect to the accompanying drawings, in which:

FIG. 2 b) illustrates a second embodiment of a non-terrestrial network;

DETAILED DESCRIPTION OF EMBODIMENTS

Figure 5:
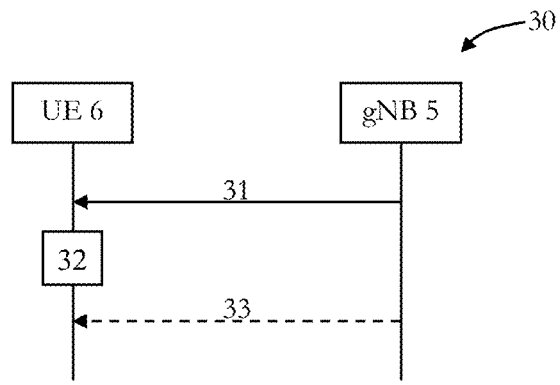
FIG. 5 is a state diagram of an embodiment of a method.

Before a detailed description of the embodiments under reference of FIG. 5 is given, general explanations are made.

As mentioned in the outset, in general, several generations of mobile telecommunications systems are known, e.g. the third generation ("3G"), which is based on the International Mobile Telecommunications-2000 (IMT-2000) specifications, the fourth generation ("4G"), which provides capabilities as defined in the International Mobile Telecommunications-Advanced Standard (IMT-Advanced Standard), and the current fifth generation ("5G"), which is under development and which might be put into practice in the year 2020.

One of the candidates for meeting the 5G requirements are termed New Radio (NR) Access Technology Systems. Some aspects of NR can be based on LTE technology, in some embodiments, just as some aspects of LTE were based on previous generations of mobile communications technology.

Moreover, as discussed in the outset, for example, 3GPP TR 38.811 document "3rd Generation Partnership Project; Technical Specification Group Radio Access Network; Study on New Radio (NR) to support non terrestrial networks (Release 15)" gives some indications of how to implement New Radio (NR) for Non-Terrestrial Networks (NTN), and some embodiments apply to either Non-Terrestrial networks operating alone or to integrated terrestrial and Non-Terrestrial networks and some embodiments may provide an impact on coverage, user bandwidth, system capacity, service reliability or service availability, energy consumption, connection density or the like. Some embodiments may be applied in 5G systems for the following verticals: transport, Public Safety, Media and Entertainment, eHealth, Energy, Agriculture, Finance, Automotive or the like.

Generally, for NTN it is known that an entity, such as a satellite or an aerial device, emits one or more radio beams for communicating with other aerial or terrestrial entities, such as base stations, user equipments (which may be terrestrial or aerial (e.g. mounted or implement in a drone or the like)) or the like.

Figure 1:
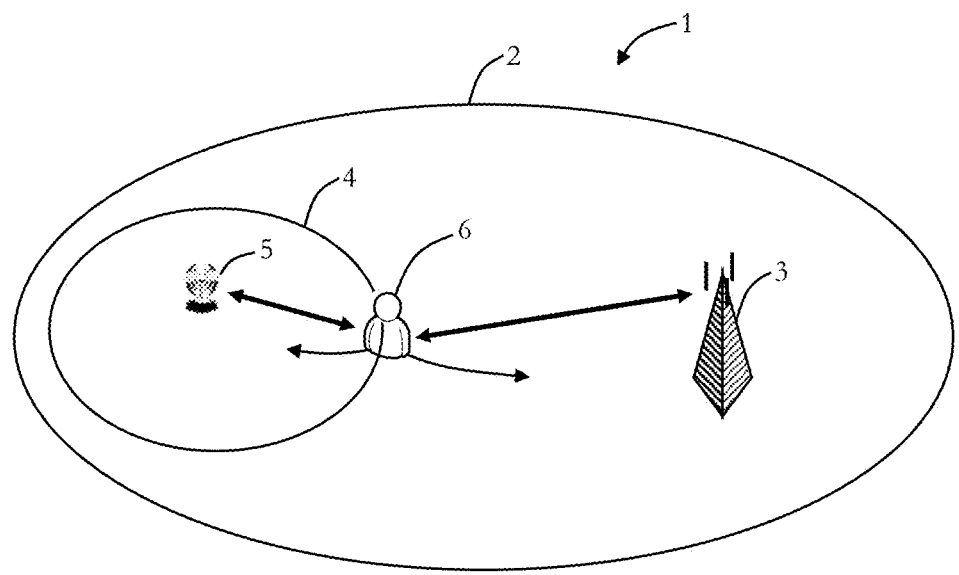
FIG. 1 illustrates an embodiment of a radio access network.

A typical embodiment of an NR radio network RAN 1 is illustrated in FIG. 1. The RAN 1 has a macro cell 2, which is established by an LTE eNodeB 3, and an NR cell 4, which is established by an NR eNodeB 5 (also referred to as gNB (next generation eNodeB)).

A UE 6 can communicate with the LTE eNodeB 3 and, as long as it is within the NR cell 4, it can also communicate with the NR eNodeB/gNB 5.

Figure 2:
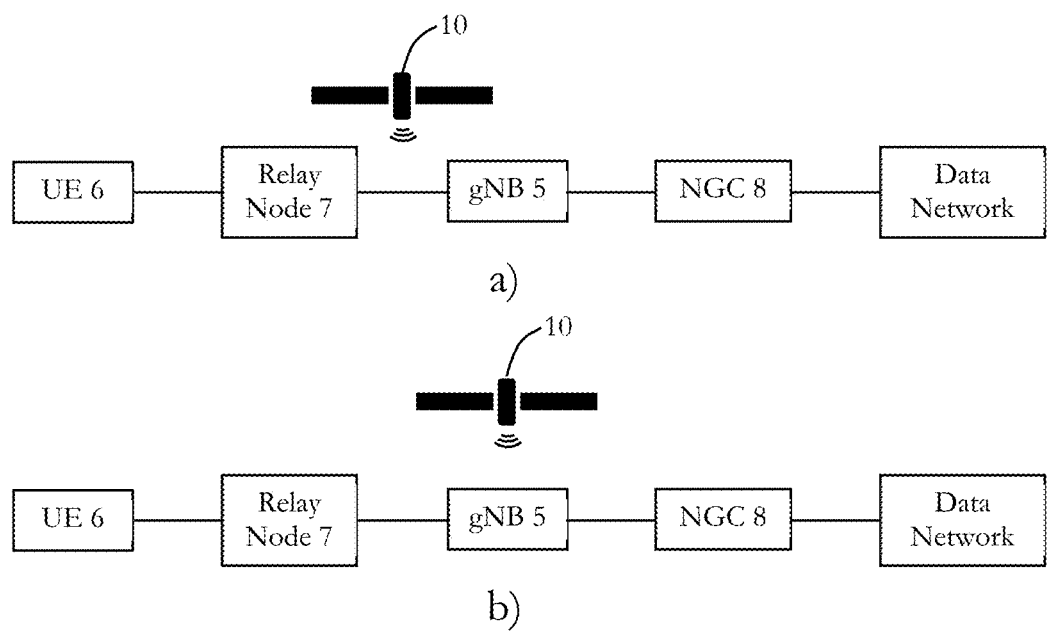
FIG. 2 a) illustrates a first embodiment of a non-terrestrial network.

FIG. 2 illustrates two different embodiments of a NTN, which may be incorporated into the overall RAN 1 of FIG. 1.

Generally, in both embodiments, the UE 6 communicates with a Relay Node (RN) 7, which in turns transfers the communication between the UE 6 and the gNB 5. The gNB 5 communicates with the Next Generation Core NGC 8 which is coupled to a data network 9.

In the embodiment of FIG. 2 a) (upper part), a satellite 10 (or aerial device or the like) communicates with the relay node 7 and the gNB 5 and, thus, functions as a relay relaying a "satellite friendly" NR signal between the gNB 5 and the relay node 7 in a transparent manner.

In the embodiment of FIG. 2 b) (lower part), the satellite 10 (or aerial device or the like) embarks full or part of the gNB 5 to generate/receive a "satellite friendly" NR signal to/from the relay node 7. In some embodiments, this requires sufficient on board processing capabilities of the satellite or aerial or the like) to be able to include a gNB or a relay node functionality.

Relay Node (RN) related use cases, as illustrated in FIG. 2, may be implemented, in some commercial related deployments of NTN, e.g. a relay node mounted on high speed train, relay node mounted in cruise ship, relay node at home/office and relay node mounted on airliner, etc.

Figures 3, 4A:
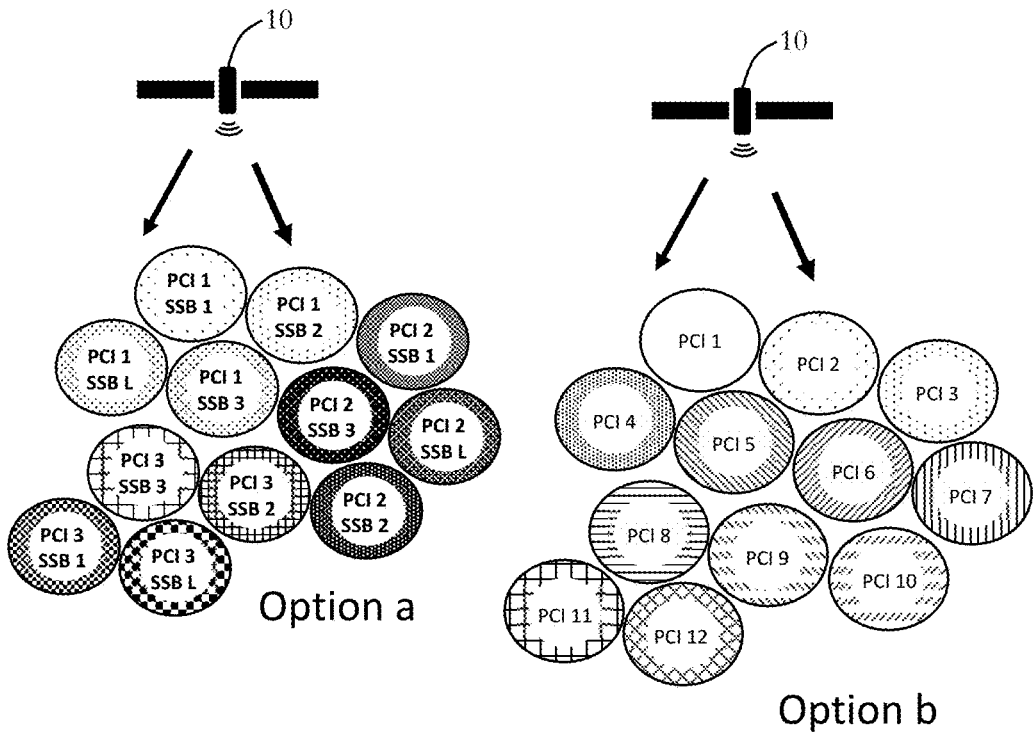
FIG. 3 illustrates two embodiments of non-terrestrial networks.
FIG. 4a illustrates TCI information for PDSCH transmission.

FIG. 3 illustrates two embodiments, which may be implemented in a NTN, wherein the satellite(s) 10 may be low earth orbit satellites which emit one or more beams which, thus, provided moving cells as illustrated in FIG. 3.

According to an option a, depicted on the left side of FIG. 3, the satellite 10 (aerial or the like) emits one or more beams which are each associated with a cell, wherein each circle corresponds to one cell (such as cell 4 in FIG. 1). The satellite 10 shares physical cell identity (PCI) between satellite beams, wherein one satellite beam may be formed of one or several synchronization signal block (SSB) beams. Hence, in FIG. 3, option a, always four cells are associated with the same PCI information, but they are associated with different SSB beams.

Hence, in the case that a UE, such as UE 6 is covered by different cells, due to movement of the satellite 10, which are associated with the same PCI, but different SSB beams, a beam change procedure or beam management procedure may be applied in some embodiments, since the satellite beam's movement may dealt with by a beam management procedure.

In option b, depicted on the right side of FIG. 3, each cell (i.e. each circle) is associated with a different PCI information and a different beam. Hence, in such embodiments, a cell handover procedure may be applied, when the UE is covered by a different cell. Additionally, also a beam management procedure may be applied.

Hence, some embodiments pertain to a beam management procedure for NTN, wherein some embodiments are applied to both options a and b as discussed above under reference of FIG. 3. Some embodiments address the handover/beam management for a relay node, wherein some embodiments are implemented for conventional UE as well.

In some embodiments, for UEs in RRC_CONNECTED state, there will be cell level mobility and beam level mobility, as also discussed for FIG. 3, since the satellite and/or the UE may move, such that the UE will be covered by different cells and beams.

In some embodiments, for the beam level mobility, it is dealt with at lower layers by means of physical layer and MAC layer control signaling, wherein RRC may not be required to know which beam is being used at a given point in time.

And according to 3GPP TS 38.321 V15.3.0 "5G; NR; Medium Access Control (MAC) protocol specification (3GPP TS 38.321 version 15.3.0 Release 15)", section 6.1.3.14 and section 6.1.3.15, the MAC CEs as shown in FIGS. 4 a) and b) are used to implement the activation/deactivation of a transmission configuration indicator (TCI) (beam) for UE specific Physical Downlink Shared Channel (PDSCH) and Physical Downlink Control Channel (PDCCH).

Figure 4B:
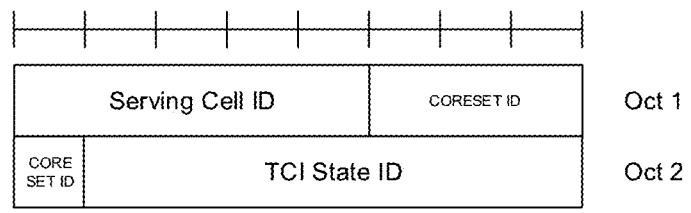
FIG. 4b illustrates TCI information for PDCCH transmission.

For the PDSCH case, as can be taken from FIG. 4 a), up to 8 TCI states are activated from a list of pre-configured TCI states (up to 128) for a given bandwidth part (BWP). Here, each TCI corresponds to one beam.

For the PDCCH case, as shown in FIG. 4 b), one TCI state is activated from a list of pre-configured TCI states (up to 128) for a given control resource set (CORESET) as shown in the drawing in section 6.1.3.15-1 of 3GPP referred to above.

In some embodiments, by considering the characteristics of the spot beam movement of a specific satellite or aerial or the like), e.g. based on a pre-defined satellite movement pattern which may be known by the network or a UE, the TCI corresponding spot beam which is going to cover a certain UE at a certain point of time is predictable. For example, the order of target spot beams covering a UE at a given time may be predicted (e.g. 1, 2, 3 . . . ) from the list of known TCI states (as shown in FIGS. 4 a) and b)), based on the satellite ephemeris information, UE's location, moving direction, etc.

In the current NR, a UE measures reference signals regularly for identifying new candidate beams as well as for detecting whether configured or activated beams are no longer available. However, if the UE knows which beams will be available in the near future including the exact timing due to the satellite ephemeris information, the UE's location and velocity information, etc., the UE does not need to report the measurements in some embodiments, and it just needs to know which spot beams will be available next or in the near future.

Hence, as illustrated in FIG. 5 showing state diagram of a mobile telecommunications system method 30, in this case, a series (a batch) of TCI activation/deactivation MAC CEs (media access control configuration element) is issued form the gNB 5 for a UE 6 when it accesses the NTN and/or at handover/move to another satellite (in this case, a cell ID may be added in the MAC CE to indicate the target cell and its beams). In addition, there is provided a timer/timestamp, on the basis of which the UE determines at 32, when the corresponding MAC CE should be executed, which is corresponding (in the time domain) to when a certain spot beam (TCI) is going to provide service for this UE 6, wherein the UE's location and velocity, moving path as well as the satellite ephemeris information are taken into account.

The timer/timestamp is implemented according to at least one of the following options:
1) The execution time information is included in each MAC CE.
2) A dedicated radio resource control (RRC) signalling will include this time information, e.g. in RRC connection establishment (wherein in this case the method 30 provides a corresponding RRC connection establishment) or in RRC connection reconfiguration.
3) A pre-defined timer (which is stored, for example, in advance in the UE).

The network, e.g. gNB 5, will adjust the MAC CE series if necessary at later stage, e.g. according to UE's location report, velocity, UE path information/direction of travel, etc.

The benefits may be that the batch MAC CE transmission mechanism may effectively ease the long propagation problem, especially when UE may need to change beam frequently in low earth orbiting (LEO) NTN, and/or the UE may reduce the power consumption as it will not measure reference signals for beam management.

Figure 6:
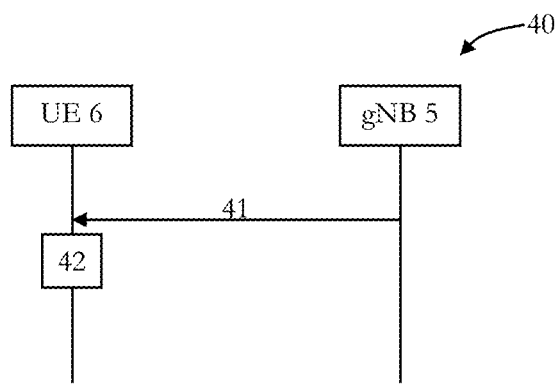
FIG. 6 is a state diagram of another embodiment of a method.

In another embodiment, as illustrated in FIG. 6 showing a state diagram of a mobile telecommunications system method 40, the UE 6 is signalled at 41 a list of TCI states from the gNB that will be activated in the near future and a timer/timestamp associated with each TCI state. The UE 6 determines at 42 thereon when the corresponding TCI state should be activated.

Figure 7:
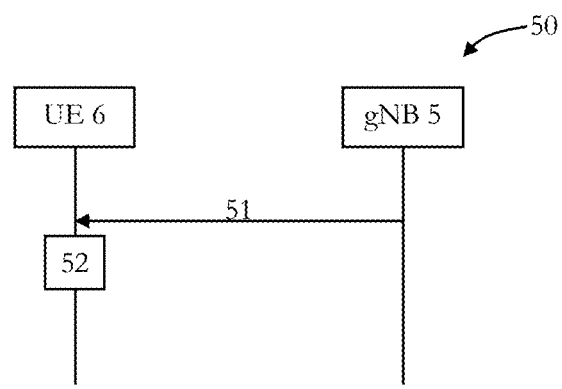
FIG. 7 is a state diagram of an embodiment of a method.

In another embodiment, as illustrated in FIG. 7 showing a state diagram of a mobile telecommunications system method 50, the network, e.g. gNB 5, informs a UE 6 at 51 about the value of timer/timestamp associated with each TCI state, wherein the timer value is derived from the UE location, UE path information (direction of travel) as well as the satellite ephemeris information, etc. At 52, determines based on this information received at 51, which TCI state will be used.

As has been discussed above, some embodiments address a beam level mobility enhancement with a detailed MAC CE design/enhancement for NTN, as discussed above.

Figure 8:
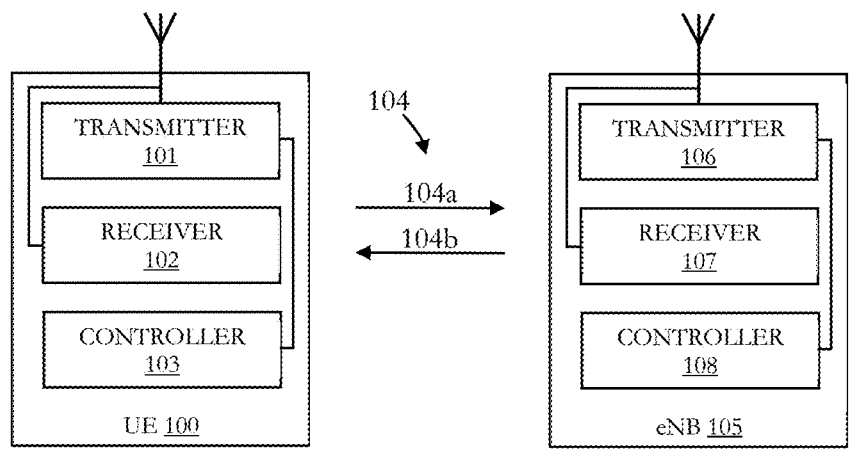
FIG. 8 schematically illustrates a user equipment and a base station.

An embodiment of an UE 100 and an eNB 105 (or NR eNB/gNB) and a communications path 104 between the UE 100 and the eNB 105, which are used for implementing embodiments of the present disclosure, is discussed under reference of FIG. 8.

The UE 100 has a transmitter 101, a receiver 102 and a controller 103, wherein, generally, the technical functionality of the transmitter 101, the receiver 102 and the controller 103 are known to the skilled person, and, thus, a more detailed description of them is omitted.

The eNB 105 has a transmitter 106, a receiver 107 and a controller 108, wherein also here, generally, the functionality of the transmitter 106, the receiver 107 and the controller 108 are known to the skilled person, and, thus, a more detailed description of them is omitted.

The communication path 104 has an uplink path 104a, which is from the UE 100 to the eNB 105, and a downlink path 104b, which is from the eNB 105 to the UE 100.

During operation, the controller 103 of the UE 100 controls the reception of downlink signals over the downlink path 104b at the receiver 102 and the controller 103 controls the transmission of uplink signals over the uplink path 104a via the transmitter 101.

Similarly, during operation, the controller 108 of the eNB 105 controls the transmission of downlink signals over the downlink path 104b over the transmitter 106 and the controller 108 controls the reception of uplink signals over the uplink path 104a at the receiver 107.

Figure 9:
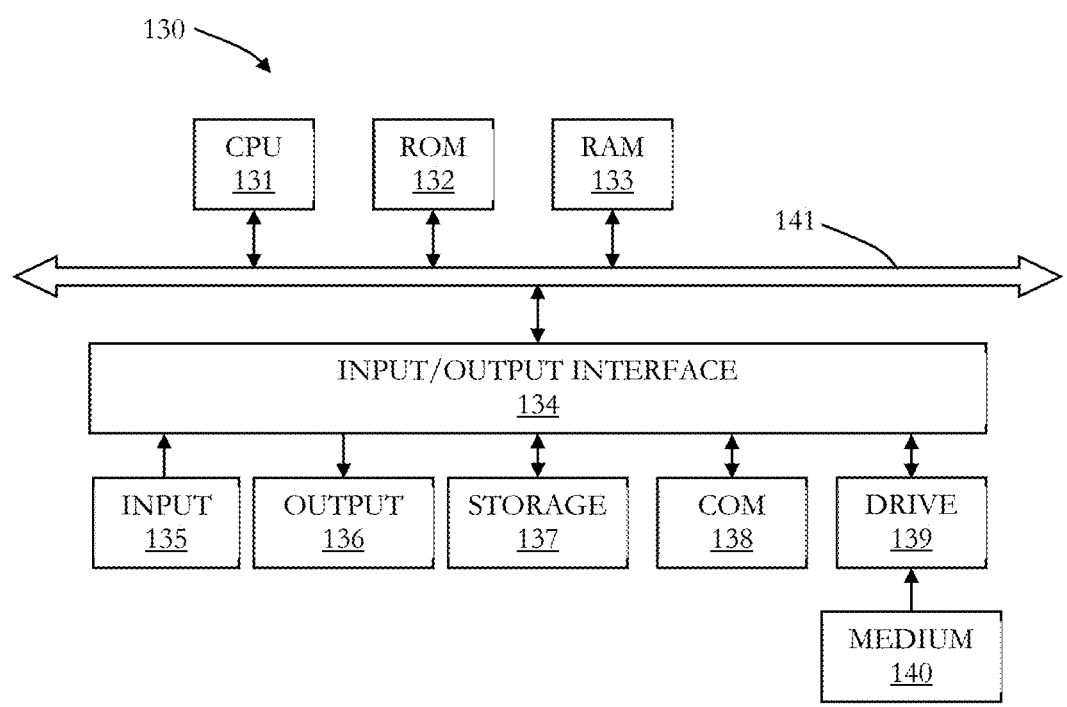
FIG. 9 illustrates a multi-purpose computer which can be used for implementing a user equipment or a base station.

In the following, an embodiment of a general purpose computer 130 is described under reference of FIG. 9. The computer 130 can be implemented such that it can basically function as any type of base station or new radio base station, transmission and reception point, or user equipment as described herein. The computer has components 131 to 141, which can form a circuitry, such as any one of the circuitries of the base stations, and user equipments, as described herein.

Embodiments which use software, firmware, programs or the like for performing the methods as described herein can be installed on computer 130, which is then configured to be suitable for the concrete embodiment.

The computer 130 has a CPU 131 (Central Processing Unit), which can execute various types of procedures and methods as described herein, for example, in accordance with programs stored in a read-only memory (ROM) 132, stored in a storage 137 and loaded into a random access memory (RAM) 133, stored on a medium 140 which can be inserted in a respective drive 139, etc.

The CPU 131, the ROM 132 and the RAM 133 are connected with a bus 141, which in turn is connected to an input/output interface 134. The number of CPUs, memories and storages is only exemplary, and the skilled person will appreciate that the computer 130 can be adapted and configured accordingly for meeting specific requirements which arise, when it functions as a base station or as user equipment.

At the input/output interface 134, several components are connected: an input 135, an output 136, the storage 137, a communication interface 138 and the drive 139, into which a medium 140 (compact disc, digital video disc, compact flash memory, or the like) can be inserted.

The input 135 can be a pointer device (mouse, graphic table, or the like), a keyboard, a microphone, a camera, a touchscreen, etc.

The output 136 can have a display (liquid crystal display, cathode ray tube display, light emittance diode display, etc.), loudspeakers, etc.

The storage 137 can have a hard disk, a solid state drive and the like.

The communication interface 138 can be adapted to communicate, for example, via a local area network (LAN), wireless local area network (WLAN), mobile telecommunications system (GSM, UMTS, LTE, NR etc.), Bluetooth, infrared, etc.

It should be noted that the description above only pertains to an example configuration of computer 130. Alternative configurations may be implemented with additional or other sensors, storage devices, interfaces or the like. For example, the communication interface 138 may support other radio access technologies than the mentioned UMTS, LTE and NR.

When the computer 130 functions as a base station, the communication interface 138 can further have a respective air interface (providing e.g. E-UTRA protocols OFDMA (downlink) and SC-FDMA (uplink)) and network interfaces (implementing for example protocols such as S1-AP, GTP-U, S1-MME, X2-AP, or the like). Moreover, the computer 130 may have one or more antennas and/or an antenna array. The present disclosure is not limited to any particularities of such protocols.

Summarizing, and as is also apparent from the description given above, some embodiments pertain to a network entity for a mobile telecommunications system including circuitry configured to communicate with at least one user equipment, wherein the circuitry is further configured to transmit, to the at least one user equipment, time information for indicating a beam which will cover the at least one user equipment, wherein the beam may be emitted by a satellite, a network entity (base station, aerial UE or the like), etc.

Some embodiments pertain to a user equipment for a mobile telecommunications system including circuitry configured to communicate with at least one network entity, wherein the circuitry is further configured to determine a beam which will cover the user equipment on the basis of time information.

A mobile telecommunications system method for providing communication between at least one user equipment and at least one network entity, including determining a beam which will cover the at least one user equipment on the basis of time information.

The network entity may be a base station NR base station, gNB, eNodeB, a relay node or the like. The user equipment may be a mobile terminal, smartphone, laptop, computer, etc. The circuitry may include one or more processors, interfaces, storage devices, etc., which is typically needed for implementing a network entity. Generally, the mobile telecommunications system may be include and/or pertain to GSM, LTE, NR, 5G, etc., as discussed herein.

Some embodiments pertain also to a mobile telecommunications system including, for example, at least one network entity and at least one user equipment as discussed herein. Moreover, the network entity, the user equipment and or the mobile telecommunications system may be configured to perform the method discussed herein.

As mentioned, the satellite (including any type of aerial device) may by a low earth orbit satellite which provides non-terrestrial network capabilities and may be part of it. As such satellites may move quickly with respect to the surface of the earth, also a beam, which is emitted, moves quickly on the surface of the earth, such that a UE may experience only a short duration of a coverage of one beam. Similarly, also other network entities may emit a beam, and the UE itself may move quickly (e.g. a UE in a train, car, aircraft, etc.), such that also in such cases the UE may experience only a short duration of a coverage of one beam.

However, by having the time information, the UE may know at which time and at which location the next beam either from the same satellite or from another satellite (or other network entity) may cover the UE (i.e. when and where the beam is switched).

The time information may include a timer or a time stamp, wherein the timer, for example, indicates how much time is left until the beam switch happens and the time stamp may be indicative of the point of the time, when the beam switch happens.

The time information may be determined by the network entity (or other entity within the network) and/or the user equipment. The time information may be determined, since the travel path and the velocity of the beams of the satellite and of other satellites are known, and, moreover, also the velocity and the travel path of the user equipment may be known, such that even for moving user equipments the beam switch may be indicated by the time information.

The time information may be associated with a transmission configuration indicator (TCI), such that the user equipment may have also the TCI of the (next) beam, wherein the transmission configuration indicator may be associated with a beam or a cell and an associated beam (see also FIG. 3 and the associated description).

Moreover, the transmission configuration indicator is associated with a media access control configuration element MAC CE, wherein multiple transmission configuration indicators and multiple media access control configuration elements may be transmitted to the at least one user equipment and received by it. Hence, in some embodiments a batch of MAC CE is transmitted and received, such that the UE has the information for multiple beam switches in advance.

The time information may be included in the media access control configuration element, such that, for example, for each MAC CE the associated time information (timer/time stamp) is available in advance.

The media access control configuration elements may be adapted based on at least one of: UE's location report, velocity, UE path information, UE direction of travel, satellite ephemeris information. Thus, in particular in the case that the UE changes a travel path or the like, the MAC CE can be updated accordingly.

In some embodiments, the time information is transmitted in a radio resource signaling.

In some embodiments, a list of transmission configuration indicators and the associated time information are transmitted and received by the user equipment. Thereby, the UE has the list of TCI and the associated points of time at which they are applicable in advance for the coming beam switch(es).

In some embodiments, the time information is associated with a transmission configuration indicator state, the time information being derived on at least one of: UE location, UE path information, satellite ephemeris information, as discussed.

In some embodiments, the time information is predefined and may even be pre-stored in the UE.

The methods as described herein are also implemented in some embodiments as a computer program causing a computer and/or a processor and/or circuitry to perform the method, when being carried out on the computer and/or processor and/or circuitry. In some embodiments, also a non-transitory computer-readable recording medium is provided that stores therein a computer program product, which, when executed by a processor and/or circuitry, such as the processor and/or circuitry described above, causes the methods described herein to be performed.

It should be recognized that the embodiments describe methods with an exemplary order of method steps. The specific order of method steps is, however, given for illustrative purposes only and should not be construed as binding.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using a software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) A network entity for a mobile telecommunications system comprising circuitry configured to communicate with at least one user equipment, wherein the circuitry is further configured to:
transmit, to the at least one user equipment, time information for indicating a beam which will cover the at least one user equipment.

(2) The network entity of (1), wherein the time information includes a timer or a time stamp.

(3) The network entity of (1) or (2), wherein the time information is associated with a transmission configuration indicator.

(4) The network entity of (3), wherein the transmission configuration indicator is associated with a beam or a cell and an associated beam.

(5) The network entity of (4), wherein the transmission configuration indicator is associated with a media access control configuration element.

(6) The network entity of (5), wherein multiple transmission configuration indicators and multiple media access control configuration elements are transmitted to the at least one user equipment.

(7) The network entity of (6), wherein the time information is included in the media access control configuration element.

(8) The network entity of (7), wherein the media access control configuration elements are adapted based on at least one of: UE's location report, velocity, UE path information, UE direction of travel, satellite ephemeris information.

(9) The network entity of anyone of (1) to (8), wherein the time information is transmitted in a radio resource signaling.

(10) The network entity of anyone of (1) to (9), wherein a list of transmission configuration indicators and the associated time information are transmitted.

(11) The network entity of anyone of (1) to (10), wherein the time information is associated with a transmission configuration indicator state, the time information being derived on at least one of: UE location, UE path information, satellite ephemeris information.

(12) A user equipment for a mobile telecommunications system comprising circuitry configured to communicate with at least one network entity, wherein the circuitry is further configured to:
determine a beam which will cover the user equipment on the basis of time information.

(13) The user equipment of (12), wherein the time information includes a timer or a time stamp.

(14) The user equipment of (12) or (13), wherein the time information is associated with a transmission configuration indicator.

(15) The user equipment of (14), wherein the transmission configuration indicator is associated with a beam or a cell and an associated beam.

(16) The user equipment of (15), wherein the transmission configuration indicator is associated with a media access control configuration element.

(17) The user equipment of (16), wherein multiple transmission configuration indicators and multiple media access control configuration elements are received from the at least one network entity.

(18) The user equipment of (17), wherein the time information is included in the media access control configuration element.

(19) The user equipment of (18), wherein the media access control configuration elements are adapted based on at least one of: UE's location report, velocity, UE path information, UE direction of travel, satellite ephemeris information.

(20) The user equipment of anyone of (12) to (19), wherein the time information is received in a radio resource signaling.

(21) The user equipment of anyone of (12) to (20), wherein a list of transmission configuration indicators and the associated time information are received from the at least one network entity.

(22) The user equipment of (12) to (20), wherein the time information is associated with a transmission configuration indicator state, the time information being derived on at least one of: UE location, UE path information, satellite ephemeris information.

(23) The user equipment of anyone of (12) to (22), wherein the time information is received from the at least one network entity.

(24) The user equipment of anyone of (12) to (23), wherein the time information is predefined.

(25) A mobile telecommunications system method for providing communication between at least one user equipment and at least one network entity, comprising:
determining a beam which will cover the at least one user equipment on the basis of time information.

(26) The method of (25), wherein the time information includes a timer or a time stamp.

(27) The method (25) or (26), wherein the time information is associated with a transmission configuration indicator.

(28) The method of (27), wherein the transmission configuration indicator is associated with a beam or a cell and an associated beam.

(29) The method of (28), wherein the transmission configuration indicator is associated with a media access control configuration element.

(30) The method of (29), wherein multiple transmission configuration indicators and multiple media access control configuration elements are received from the at least one network entity.

(31) The method of (30), wherein the time information is included in the media access control configuration element.

(32) The method of (31), wherein the media access control configuration elements are adapted based on at least one of: UE's location report, velocity, UE path information, UE direction of travel, satellite ephemeris information.

(33) The method of anyone of (25) to (32), wherein the time information is received in a radio resource signaling.

(34) The method of anyone of (25) to (32), wherein a list of transmission configuration indicators and the associated time information are received from the at least one network entity.

(35) The method of anyone of (25) to (34), wherein the time information is associated with a transmission configuration indicator state, the time information being derived on at least one of: UE location, UE path information, satellite ephemeris information.

(36) The method of anyone of (25) to (35), wherein the time information is received from the at least one network entity.

(37) The method of anyone of (25) to (36), wherein the time information is predefined.

(38) The method of anyone of (25) to (37), wherein the beam is emitted by a satellite.

The invention claimed is:

1. A method for a network entity of a mobile telecommunications system, the method comprising:
communicating with at least one user equipment;
modifying a batch of media access control configuration elements (MAC CEs) based on a velocity of the at least one user equipment and a direction of travel of the at least one user equipment; and
transmitting, to the at least one user equipment, the batch of MAC CEs, each MAC CE including time information for indicating a beam which will cover the at least one user equipment as the at least one user equipment moves.

2. The method of claim 1, wherein the time information includes a timer or a time stamp.

3. The method of claim 1, wherein the time information is associated with a transmission configuration indicator.

4. The method of claim 3, wherein the transmission configuration indicator is associated with a beam or a cell and an associated beam.

5. The method of claim 1, wherein the batch of MAC CEs are modified further based on a user equipment location report, user equipment path information, and satellite ephemeris information.

6. The method of claim 1, wherein the time information is transmitted in a radio resource signaling.

7. The method of claim 1, wherein a list of transmission configuration indicators and the associated time information are transmitted.

8. The method of claim 1, wherein
the time information is associated with a transmission configuration indicator state, and
the time information is derived on at least one of a user equipment location, user equipment path information, and satellite ephemeris information.

9. A method for user equipment, the method comprising:
communicating with a network entity of a mobile telecommunications system;
receiving, from the network entity, a batch of media access control configuration (MAC CEs), each MAC CE including time information; and
determining a beam which will cover the user equipment based on the time information as the user equipment moves, wherein
the batch of MAC CEs is modified by the network entity based on a velocity of the user equipment and a direction of travel of the user equipment.

10. The method of claim 9, wherein the time information includes a timer or a time stamp.

11. The method of claim 9, wherein the time information is associated with a transmission configuration indicator.

12. The method of claim 11, wherein the transmission configuration indicator is associated with a beam or a cell and an associated beam.

13. The method of claim 9, wherein the MAC CEs are modified further based on a user equipment location report, user equipment path information, and satellite ephemeris information.

14. Circuitry for a user equipment, the circuitry comprising:
transceiver circuitry; and
control circuitry configured with the transceiver circuitry to
communicate with a network entity of a mobile telecommunications system;
receive, from the network entity, a batch of media access control configuration (MAC CEs), each MAC CE including time information from the network entity; and
determine a beam which will cover the user equipment based on the time information as the user equipment moves, wherein
the batch of MAC CEs is modified by the network entity based on a velocity of the user equipment and a direction of travel of the user equipment.

15. The circuitry of claim 14, wherein the MAC CEs are modified further based on at least one of a user equipment location report, user equipment path information, and satellite ephemeris information.

* * * * *